(12) United States Patent
Dafesh et al.

(10) Patent No.: US 8,515,335 B2
(45) Date of Patent: Aug. 20, 2013

(54) COGNITIVE ANTI-JAM RECEIVER SYSTEMS AND ASSOCIATED METHODS

(75) Inventors: Philip Anthony Dafesh, Manhattan Beach, CA (US); Raghavendra S. Prabhu, Los Angeles, CA (US); Esteban Luis Valles, Los Angeles, CA (US)

(73) Assignee: The Aerospace Corporation, El Segundo, CA (US)

( * ) Notice: Subject to any disclaimer, the term of this patent is extended or adjusted under 35 U.S.C. 154(b) by 826 days.

(21) Appl. No.: 12/627,875

(22) Filed: Nov. 30, 2009

(65) Prior Publication Data
US 2011/0128178 A1 Jun. 2, 2011

(51) Int. Cl.
*H04K 3/00* (2006.01)
*H04B 17/00* (2006.01)
*H04M 11/00* (2006.01)
*H04W 4/00* (2009.01)

(52) U.S. Cl.
USPC ......... 455/1; 455/67.11; 455/426.1; 455/403; 455/422.1

(58) Field of Classification Search
USPC .............. 455/63.1, 67.1, 1, 226.1, 422.1, 403
See application file for complete search history.

(56) References Cited

U.S. PATENT DOCUMENTS

| | | | |
|---|---|---|---|
| 4,608,701 A | 8/1986 | Burgers et al. | |
| 5,259,030 A | 11/1993 | Francis | |
| 5,953,365 A | 9/1999 | Badke | |
| 6,842,498 B2 | 1/2005 | Heinzl et al. | |
| 6,961,017 B1 * | 11/2005 | Naylor et al. | 342/357.29 |
| 7,466,960 B2 | 12/2008 | Sugar | |
| 8,233,412 B1 * | 7/2012 | Abbey et al. | 370/276 |
| 8,301,075 B2 * | 10/2012 | Sherman et al. | 455/1 |
| 2008/0279093 A1 | 11/2008 | Hassan et al. | |
| 2009/0197550 A1 * | 8/2009 | Huttunen et al. | 455/161.1 |
| 2009/0210757 A1 * | 8/2009 | Yue et al. | 714/704 |
| 2009/0282309 A1 * | 11/2009 | Yue et al. | 714/748 |
| 2010/0289688 A1 * | 11/2010 | Sherman et al. | 342/16 |

OTHER PUBLICATIONS

Jeffrey A. Young, et al., "Analysis of DFT-Based Frequency Excision Algorithms for Direct-Sequence Spread-Spectrum Communications." IEEE Transactions on Communications. vol. 46, No. 8, Aug. 1998. 1076-1087.

Paul T. Capozza, et al., "A Single-Chip Narrow-Band Frequency-Domain Excisor for a Global Positioning System (GPS) Receiver." IEEE Journal of Solid-State Circuits. vol. 35, No. 3, Mar. 2000. 401-411.

(Continued)

*Primary Examiner* — Tilahun B Gesesse
(74) *Attorney, Agent, or Firm* — Sutherland Asbill & Brennan LLP (57) ABSTRACT

Cognitive anti-jam receiver systems and associated methods are provided. The systems and methods may include a signal analysis module that processes a baseband signal to determine one or more signal characteristics of the baseband signal, the baseband signal comprising at least a desired signal; a cognitive decision unit that receives the one or more signal characteristics from the signal analysis module, and generates at least one first adaptive parameter; and at least one anti-jam processing module that processes the baseband signal to generate a modified signal that reduces an impact of at least one jammer signal on a quality of reception of the desired signal from the baseband signal, where processing by the at least one anti-jam processing module may be based at least in part on the received at least one first adaptive parameter from the cognitive decision unit.

22 Claims, 9 Drawing Sheets

(56) References Cited

OTHER PUBLICATIONS

Robert C. DiPietro, "An FFT Based Technique for Suppressing Narrow-Band Interference in PN Spread Spectrum Communications Systems." IEEE 1989. 1360-1363.

Robert F. Mills, et al., "A Comparison of Various Radiometer Detection Models." IEEE Transaction on Aerospace and Electronic Systems. vol. 32, No. 1, Jan. 1996. 467-473.

Sami Aromaa, et al., "Transform-Selective Interference Suppression Algorithm for Spread-Spectrum Communications." IEEE Signal Processing Letters. vol. 12, No. 1, Jan. 2005. 49-51.

Stuart D. Sandberg, "Adapted Demodulation for Spread-Spectrum Receivers which Employ Transform-Domain Interference Excision." IEEE Transactions on Communications. vol. 43, No. 9, Sep. 1995. 2502-2510.

* cited by examiner

COGNITIVE ANTI-JAM RECEIVER SYSTEMS AND ASSOCIATED METHODS

FIELD OF THE INVENTION

Aspects of the invention related generally to interference mitigation, and more particularly, to cognitive anti-jam receiver systems and methods.

BACKGROUND OF THE INVENTION

Interference caused by intentional or unintentional jamming, co-channel users, or adjacent channel users can cause severe degradation in receiver performance. Existing Anti-Jam and interference mitigation techniques are based on the assumption that the nature of interference is known a priori. Thus, these existing techniques use "fixed" Anti-Jam and interference mitigation techniques. However, these fixed techniques are not well-suited in situations where the nature of the interference changes unpredictably or where the nature of the interference is not known a priori. Thus, there is a need in the industry for cognitive anti-jam receiver systems and associated methods.

SUMMARY OF THE INVENTION

According to an example embodiment of the invention, there is a cognitive anti-jam receiver system. The system may include a signal analysis module that processes a baseband signal to determine one or more signal characteristics of the baseband signal, the baseband signal comprising at least a desired signal; a cognitive decision unit that receives the one or more signal characteristics from the signal analysis module, and generates at least one first adaptive parameter; and at least one anti-jam processing module that processes the baseband signal to generate a modified signal that reduces an impact of at least one jammer signal on a quality of reception of the desired signal from the baseband signal, where processing by the at least one anti-jam processing module is based at least in part on the received at least one first adaptive parameter from the cognitive decision unit. The system may further include the cognitive decision unit further generating at least one second adaptive parameter, and a receiver signal processing module that processes the modified signal from the at least one anti-jam processing module to extract information about the desired signal from the modified signal, where processing by the receiver signal processing module is based at least in part on the received at least one second adaptive parameter from the cognitive decision unit.

According to another example embodiment of the invention, there is a cognitive anti-jam receiver method. The method may include processing, by a signal analysis module, a baseband signal to determine one or more signal characteristics of the baseband signal, the baseband signal comprising at least a desired signal; generating, by a cognitive decision unit based upon one or more signal characteristics received from the signal analysis module, at least one first adaptive parameter; and processing, by at least one anti-jam processing module, the baseband signal to generate a modified signal that reduces an impact of at least one jammer signal on a quality of reception of the desired signal from the baseband signal, where processing by the at least one anti-jam processing module is based at least in part on the received at least one first adaptive parameter from the cognitive decision unit. The method may further include the cognitive decision unit further generates at least one second adaptive parameter, and processing, by a receiver signal processing module, the modified signal from the at least one anti-jam processing module to extract information about the desired signal from the modified signal, wherein processing by the receiver signal processing module is based at least in part on the received at least one second adaptive parameter from the cognitive decision unit.

BRIEF DESCRIPTION OF THE DRAWINGS

Reference will now be made to the accompanying drawings, which are not necessarily drawn to scale, and wherein.

DETAILED DESCRIPTION

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may be directed to example cognitive anti-jam receiver systems and methods. The example cognitive anti-jam receiver systems and methods may be applicable for spread-spectrum communications or non-spread-spectrum communications. The example cognitive anti-jam receiver systems and methods may utilize a signal analysis block to estimate one or more characteristics of the desired signal and/or one or more jammer signals that may be present in a received signal. It will be appreciated that the jammer signal can be any type of interference, whether intentional or not, that impacts a quality of reception of the desired signal. One or more anti-jam processing modules, or attributes/parameters associated therewith, may be adapted or adjusted based upon the estimated characteristics of the desired signal and/or one or more jammer signals. Likewise, a receiver signal processing module, or attributes/parameters associated thereof, may optionally be adapted or adjusted based upon the estimated characteristics of the desired signal and/or one or more jammer signals.

System Overview

Figure 1:
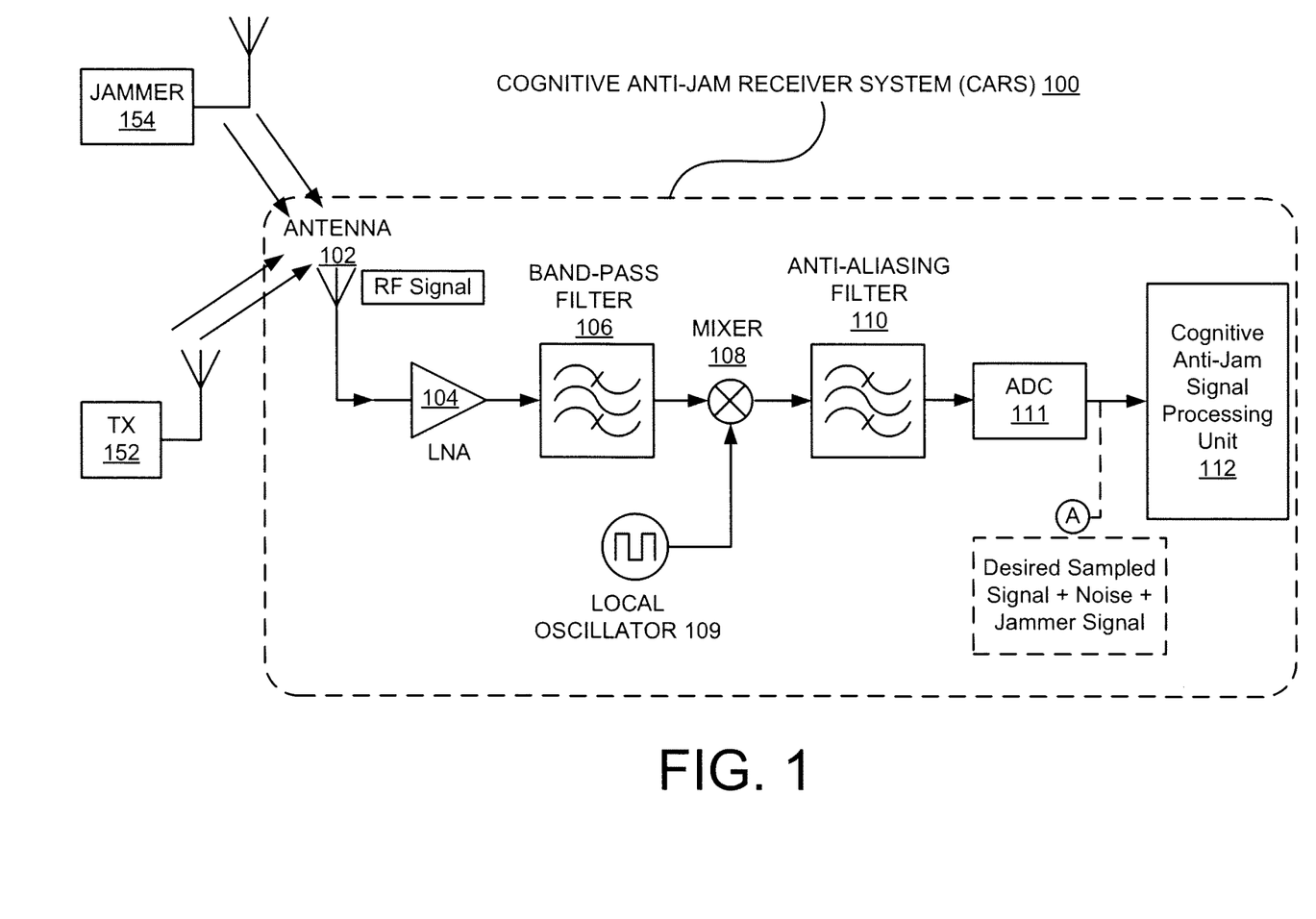
FIG. 1 illustrates a simplified block diagram of an example cognitive anti-jam receiver system (CARS) in accordance with an example embodiment of the invention.

FIG. 1 illustrates a simplified block diagram of an example cognitive anti-jam receiver system (CARS) 100 in accordance with an example embodiment of the invention. The system 100 may include an antenna 102, a low-noise amplifier (LNA) 104, a filter 106 (e.g., a band-pass filter), a downconverter comprising a mixer 108 and a local oscillator 109, an anti-aliasing filter 110, an analog-to-digital converter (ADC) 111, and a cognitive anti-jam signal processing unit 112.

During operation of the system 100, the antenna 102 may receive or detect a radio frequency (RF) signal. The RF signal may be a spread-spectrum signal or a non-spread-spectrum signal, according to an example embodiment of the invention. The RF signal may include a desired signal from a transmitter (TX) device 152. However, one or more jammer signals may also be received from one or more jammer devices 154. The jammer devices 154 may be providing intentional or unintentional jammer signals, according to an example embodiment of the invention. An unintentional jammer signal may be provided where for example, a cognitive device 154 does not detect that the primary owner of a frequency spectrum is currently utilizing the spectrum. On the other hand, an intentional jammer signal may be provided by a device 154 in order to prevent reception of the desired signal by the system 100. It will be appreciated that the one or more jammer signals may be wideband jammer signals or narrowband jammer signals, according to an example embodiment of the invention. It will also be appreciated that the jammer signal, whether intentional or unintentional, may be a reflected component of the desired signal or a multipath signal. In addition, the RF signal received or detected by the antenna 102 may further include noise, according to an example embodiment of the invention.

The RF signal received by the antenna 102 may be provided to a low-noise amplifier (LNA) 104. The amplified output of the LNA 104 may be filtered by filter 106, which may be a band-pass filter or another type of filter, according to an example embodiment of the invention. The filtered output of the filter 106 may be downconverted to a baseband signal by a downconverter comprising a mixer 108 and local oscillator 109. In one embodiment of the invention, the local oscillator 109 signal may be real-valued. In another embodiment, the local oscillator 109 may output a complex carrier comprised of in-phase and quadrature components (e.g., I-Q components), where the mixer 108 in this case may be a quadrature mixer that generates real (in-phase) and imaginary (quadrature) signal outputs. The baseband signal provided at the output of the mixer 108 may be filtered by the anti-aliasing filter 110 (e.g., a low-pass filter or another filter, real or complex) and may be sampled by the ADC 111. The sampled baseband signal having a plurality of samples, each sample comprising one or more bits which are sequentially output from the ADC, 111 one sample at a time, and may be provided to the cognitive anti-jam signal processing unit 112 for further processing as described herein according an example embodiment of the invention.

In one embodiment of the invention, the baseband signal at the output of the mixer 108 may be comprised of in-phase and quadrature signal components where the quadrature signal components which may be represented as real and imaginary signal components of a complex baseband signal. In another embodiment of the invention, the output from the mixer 108 may be output at a low intermediate frequency (IF), and filtered by an IF anti-aliasing filter 110, where the desired signal, noise, and jammer signals may be subsequently downconverted using a digital downconversion process inside of the cognitive anti-jam signal processing unit 112 to produce a digital baseband signal. Alternatively, the cognitive anti-jam signal processing unit 112 may digitally process real-valued signal at IF, without the need to digitally downconvert the signal to baseband I/Q format, according to an example embodiment of the invention. It will be appreciated that in some example embodiments, the baseband signal received by the unit 112 may include the desired sampled signal, noise, and one or more sampled jammer signals. However, in other example embodiments, the baseband signal received by the unit 112 may not necessarily include the one or more sampled jammer signals, according to an example embodiment of the invention.

It will be appreciated that the example cognitive anti-jam receiver system 100 described herein may be utilized to mitigate jammer signals, including intentional or unintentional interference, in a variety of communication system applications that may involve radio or non-radio applications. Examples of such communication system applications may include cellular communications applications such as receivers for 2 G, 2.5 G, 3 G and 4G applications as well as WiFi receivers such as 802.11b, 802.11g, 802.11n. Other examples of non-communication system applications may include radar receiver applications or satellite navigation applications such as Global Positioning System (GPS) receivers or other global navigation satellite system (GNSS) receivers. Many other communication system applications will be available without departing from example embodiments of the invention.

It will also be appreciated that the example system 100 of FIG. 1 has been provided for illustrative purposes only. Thus, many variations of the system 100 of FIG. 1 are available without departing from example embodiments of the invention.

Operational Overview

Figure 2:
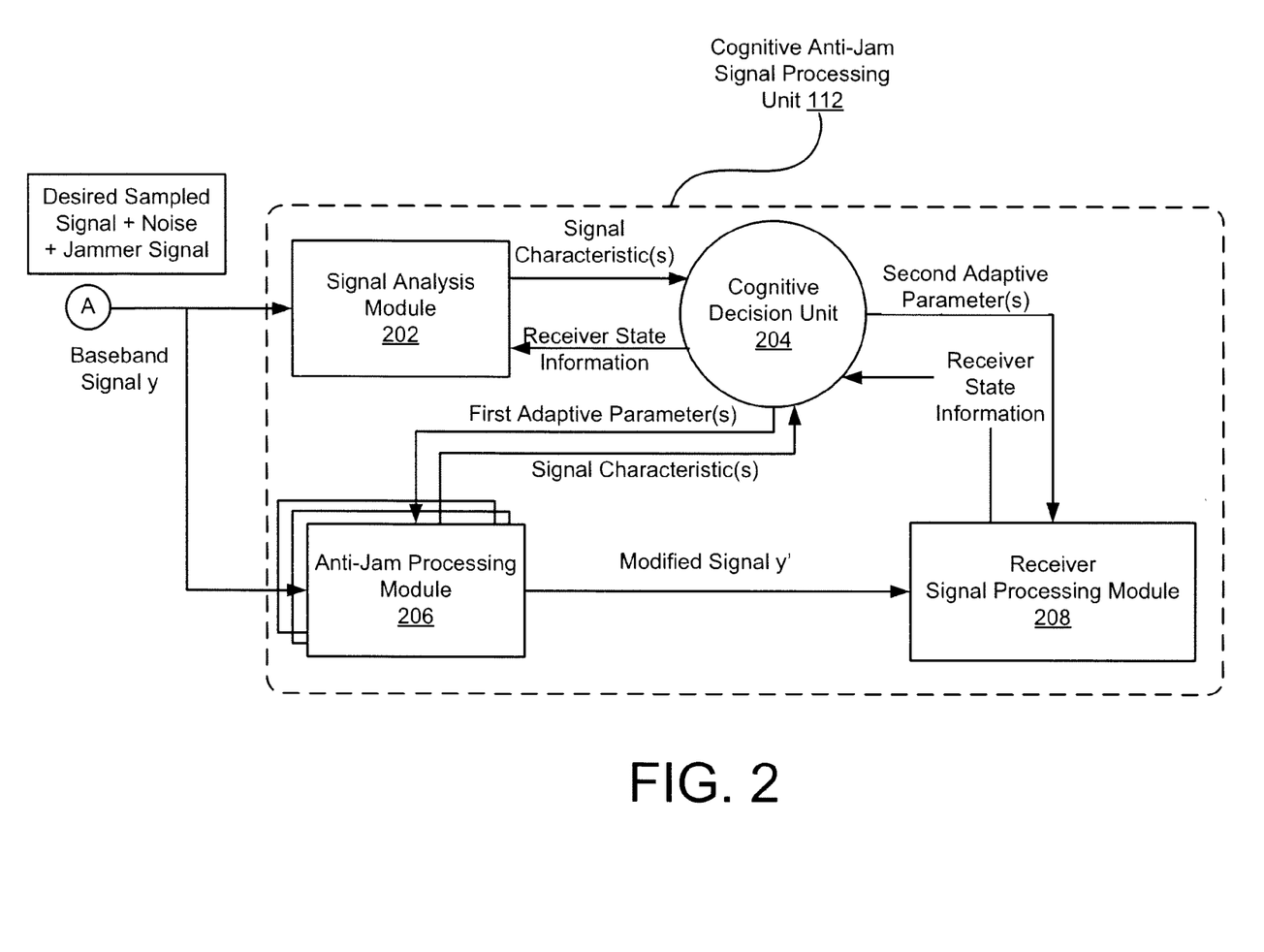
FIG. 2 illustrates a block diagram of an example cognitive anti-jam signal processing unit, according to an example embodiment of the invention.

FIG. 2 illustrates a block diagram of an example cognitive anti-jam signal processing unit 112, according to an example embodiment of the invention. The example cognitive anti-jam signal processing unit 112 may include a signal analysis module 202, a cognitive decision unit 204, one or more anti-jam processing modules 206, and a receiver signal processing module 208. It will be appreciated that while modules 202, 204, 206, 208 have been illustrated as distinct modules in FIG. 2, two or more of the modules, or portions thereof, may be integrated or provided in a single module. As an example, the signal analysis module 202 and the cognitive decision unit 204 may be integrated or provided in the same module. Likewise, the one or more anti-jam processing modules 206 and the receiver signal processing module 208 may similarly be integrated or provided in the same module. Similarly, a plurality of anti-jam processing modules 206 may be integrated or provided in a single anti-jam processing module. These and other variations or combinations of the modules illustrated in FIG. 2 are available without departing from example embodiments of the invention.

Figure 3:
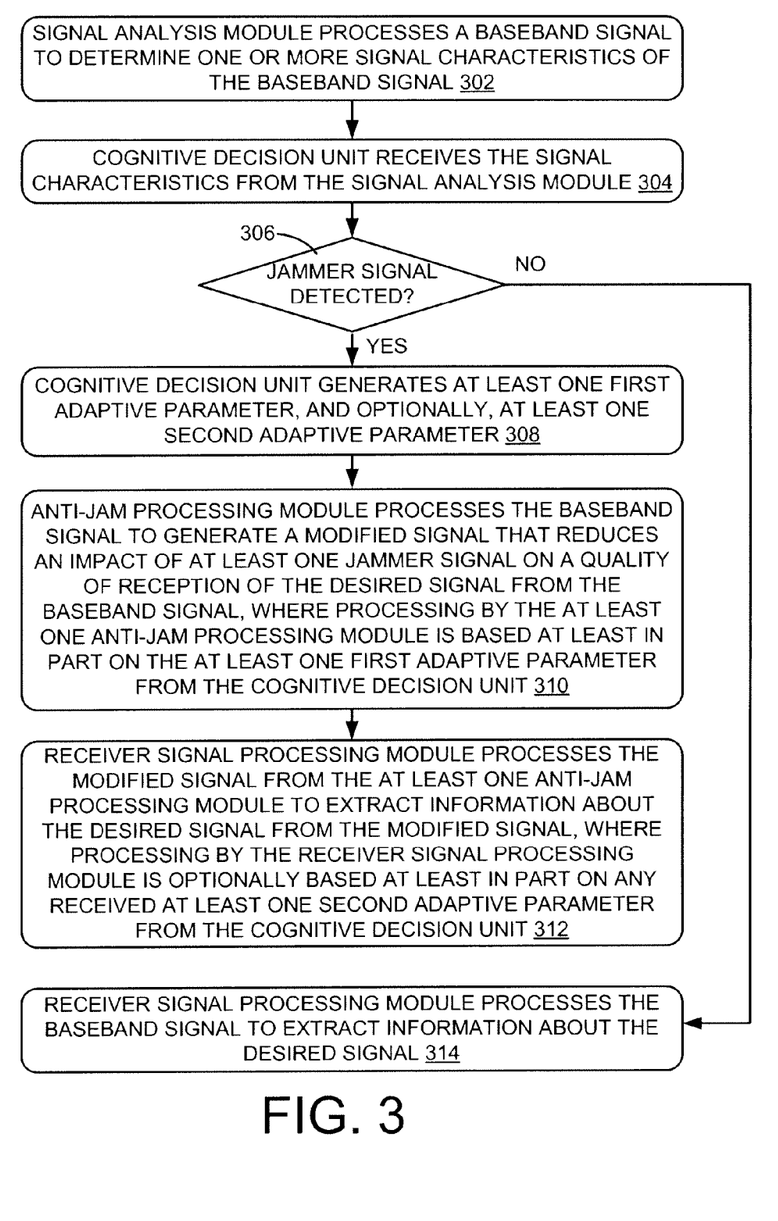
FIG. 3 illustrates a flow diagram describing an example operation of an example cognitive anti-jam signal processing unit, according to an example embodiment of the invention.

The operation of the example cognitive anti-jam signal processing unit 112 will be described with respect to the flow diagram of FIG. 3. Turning now to FIGS. 2 and 3, at block 302, the sampled baseband signal may be received by the signal analysis module 202. The signal analysis module 202 may process the sampled baseband signal to determine one or more signal characteristics of the baseband signal. As described herein, the baseband signal may include at least a desired sampled signal. However, the baseband signal may also include noise and/or one or more jammer signals as well.

In alternative embodiments of the invention, employing sampling of a signal at an intermediate frequency (IF), the sampled IF signal may be processed by the signal analysis native module. One or more of the signal characteristics may be determined, with or without prior digital downconversion to a baseband signal. Without loss of generality, this alternate embodiment of the invention may perform the same processing steps described in accordance with the cognitive anti-jam receiver method described herein, only the processing steps are carried out on an IF signal instead of a baseband signal. It will be appreciated that receiver processing may be performed directly on an IF signal or a baseband signal. Therefore, hybrid approaches where some of the processing steps are carried out at baseband and some at IF may also be used to implement the example methods described herein. Moreover, the signal may be processed without the use of an analog-to-digital converter (ADC) stage. In this additional embodiment, digital signal processing may be replaced by functionally equivalent analog signal processing, where the cognitive anti-jam receiver system and accompanying methods are carried out using analog means. Again, hybrids using analog IF, digital baseband, and digital IF are available in accordance with example embodiments of the invention.

The signal characteristics of the baseband signal may provide one or more of the following information:

Characteristics of Desired signal, which may include one or more of the following:
  a. Power Level(s) of the Desired Signal
  b. Frequenc(ies) (e.g., frequency sub-bands) where the Desired Signal have been detected
  c. Desired Signal Modulation Type
  d. Symbol rate of the desired signal
  e. Spectral shape of the desired signal Characteristics of Jammer signal, which may include one or more of the following:
  a. Power Level of Jammer Signal
  b. Frequency Support
    i. Frequenc(ies) or sub-band(s) where the jammer signal has been detected
    ii. Whether the jammer signal is a wideband jammer signal that covers a predetermined number of frequencies or sub-bands
  c. Time Support
    i. Time duration or number of samples including a jammer signal
  d. Direction of arrival of jammer signal
  e. Jammer Signal Modulation Type
  f. Jammer covariance matrix
  g. Jammer signal chipping rate
  h. Spectral shape of the jammer signal Characteristics of Noise, which may include:
  a. Noise level (e.g., a noise floor level)
  b. Noise covariance matrix Comparisons between one or more of desired signal information, jammer signal information, and noise information, which may include one or more of the following:
  a. Signal-to-Noise Ratio (SNR): ratio between desired signal power level and noise level
  b. Signal-to-Jammer Ratio: ratio between desired signal power level and jammer signal power level
  c. Jammer-to-Noise Ratio: ratio between jammer signal power level and noise level It will be appreciated that the example signal characteristics of the baseband signal described above are provided only for illustrative purposes and those other examples of signal characteristics may be available without departing from example embodiments of the invention. Likewise, it will be appreciated that some of the signal characteristics identified above may be instantaneous or averaged values, according to an example embodiment of the invention.

Following block 302, processing may proceed to block 304. At block 304, cognitive decision unit 204 may receive one or more signal characteristics, as described above, from the signal analysis module 202. Likewise, similar signal characteristics may be determined by one or more anti-jam processing modules 206 and provided to the cognitive decision unit 204. In addition, the cognitive decision unit 204 may also receive receiver state information from the receiver signal processing module 208. Alternatively, the receiver signal processing module 208 may provide receiver state information to the signal analysis module 202, which in turn provides the receiver state information to the cognitive decision unit 204. Example receiver state information may include one or more of the following: signal power level, noise floor level, receiver bit error rate performance, synchronization error and error variance performance, signal-to-noise ratio estimate, signal-to-jammer ratio estimate, jammer-to-noise ratio estimate, multi-path information, Doppler frequency shift and rate of change, signal fading characteristics, and other receiver path state information. The receiver state information can also include other information similar to the signal characteristics described herein. Indeed, in some example embodiments, at least a portion of the receiver state information may simply be a subset of the signal characteristics. It will be appreciated that the foregoing receiver state information is provided for illustrative purposes only, and that other example receiver state information is available without departing from example embodiment of the invention.

The signal characteristic information or receiver state information received by the cognitive decision unit 204 may be utilized by the cognitive decision unit 204 or otherwise, provided to one or more of the signal analysis module 202 or the one or more anti-jam processing modules 206, as described herein.

At block 306, the cognitive decision unit 204 may utilize the one or more signal characteristics provided by the signal analysis module 202 to determine whether one or more jammer signals are detected in the sampled baseband signal such that the sampled baseband signal should be processed by one or more anti-jam processing modules 206. If one or more jammer signals are detected in block 306, then processing may proceed to block 308.

At block 308, the cognitive decision unit 204 may determine which one(s) of the one or more anti-jam processing modules 206 should be selected to process the sampled baseband signal. Likewise, for the one or more selected anti-jam processing modules 206, the cognitive decision unit 204 may determine values for any adjustable attributes for the selected anti-jam processing modules 206, where the adjustable attributes may affect or alter one or more operations of the respective anti-jam processing module 206, according to an example embodiment of the invention. Accordingly, in block 308, the cognitive decision unit 204 may generate one or more first adaptive parameters for one or more anti-jam processing modules 206, wherein the one or more first adaptive parameters may indicate one or more of (i) which one(s) of the one or more anti-jam processing modules 206 have been selected to process the sampled based signal, or (ii) values for first adjustable attributes for the selected anti-jam processing modules 206. It will be appreciated that values for the adjustable attributes may vary depending on which one(s) of the anti-jam processing modules 206 have been selected. As will be described herein in further detail, each anti-jam processing module 206 may operate or perform signal processing in a particular dimension such as those associated with frequency, time, space, etc., or a combination thereof. Example first adjustable attributes are illustrated below for a few types of anti-jam processing modules 206:

Example Attributes for Time-based Anti-Jam Processing Module 206:
  a. Excision time duration attribute: Amount of time or samples to excise from a sampled baseband signal.
  b. Replacement Value attribute: Predetermined value to substitute for any excised portion of the sampled baseband signal. As an example, the predetermined value may be zero or a noise floor level, which may be received by the cognitive decision unit 204 from the signal analysis module 202 or the receiver signal processing module 208.
  c. Other attributes, including sample interpolation rate and interpolation filter type (e.g., cascade integrator comb) and number of stages, equalizer tap coefficients, etc.

Example Attributes for Transform-based Anti-Jam Processing Module 206:
  a. Sample Overlap Size attribute: Defines overlap between adjacent samples being processed.
  b. Window Type attribute: Defines the type of window used to process samples
  c. Window Size attribute: Defines a window size to utilize for the selected Window Type.
  d. Transform Type attribute: Defines which transform function(s) to be used to process windowed samples. Example transform functions can include a fast Fourier Transform (FFT), a fractional FFT (FrFFT), a Discrete Cosine Transform (DCT), and a wavelet transform.
  e. Transform Size attribute: Defines a bin size of the transform
  f. Excisor Threshold Value attribute: Defines threshold to use by excisor module to determine when a forward transform bins needs to be excised
  g. Inverse Transform attribute: Defines which inverse transform function to be used Example Attributes for Space-based Anti jam processing module 206:
  a. Number of spatial degrees of freedom attribute
  b. Number of spatial weights attribute
  c. weight update interval attribute
  d. Weight adaptation algorithm (e.g., LMS)

It will be appreciated that the example first adjustable attributes described above are only illustrative examples of first adjustable attributes that may be included with the one or more first adaptive parameters provided by cognitive decision unit 204 to the one or more anti-jam processing modules 206.

Still referring to block 308, it will be appreciated that use of the one or more anti-jam processing modules 206 may affect how the receiver signal processing module 208 processes a modified signal received from the one or more anti-jam processing modules 206. Accordingly, the one or more optional second adaptive parameters may be generated by the cognitive decision unit 204 to adjust an operation of the receiver signal processing module 208. For example, distortion may be introduced into the modified signal by the processing by one or more anti-jam processing modules 206. Thus, the one or more second parameters may be used to adjust the processing of the receiver signal processing module 208 to compensate for the distortion introduced from processing by the one or more anti-jam processing modules 206. As an example, the one or more second adaptive parameters may provide attribute values for selecting or modifying a pulse shape or parameters of a loop filter utilized by the receiver signal processing module 208. Other example second adaptive parameters may include one or more of the following: Integration or dwell period, smoothing filter impulse response, loop filter discriminator type for both carrier and symbol (or code for spread-spectrum systems) tracking respectively (e.g., decision directed, squaring, $4^{th}$ power, Costas, dot-product, early-late, etc.), discriminator spacing (e.g., for early-late discriminators). The one or more optional second adaptive parameters may be provided from the cognitive decision unit 204 to the receiver signal processing module 208, according to some example embodiments of the invention.

Following processing at block 308, processing may proceed to block 310. At block 310, the one or more anti-jam processing modules 206 may process the sampled baseband signal to generate a modified signal that reduces an impact of at least one jammer signal on a quality of reception of the desired signal from the sampled baseband signal. The processing by the one or more anti-jam processing modules 206 may be based at least in part on the received one or more first adaptive parameters from the cognitive decision unit 206. As described herein, the one or more first adaptive parameters from the cognitive decision unit 206 may indicate which one(s) of the anti-jam processing module 206 are to be selected, along with respective first adjustable attribute(s) to be used with the selected one or more anti-jam processing modules 206. The modified signal output by the one or more anti-jam processing modules 206 may be provided to the receiver signal processing module 208 at block 310.

Following processing at block 310, processing may proceed to block 312. At block 312, the receiver signal processing module 208 may process the modified signal from the one or more anti-jam processing modules 206 to extract information about the desired signal from the modified signal. At block 310, the processing by the receiver signal processing module 208 may be optionally based at least in part on the received one or more second adaptive parameters from the cognitive decision unit 204, according to an example embodiment of the invention. Indeed, the one or more second adaptive parameters may affect how the receiver signal processing module 208 processes a modified signal received from the one or more anti-jam processing modules 206.

It will also be appreciated that in some example embodiments, block 306 may not detect one or more jammer signals, or a sufficient amount of the one or more jammer signals. In this case, processing may proceed from block 306 to block 314. At block 314, the receiver signal processing module 208 may process the sampled baseband signal to extract information about the desired signal. It will be appreciated that the receiver signal processing module 208 may receive the sampled baseband signal directly from the output of ADC 111, or otherwise from an anti-jam processing module 206. It will be appreciated that if the sample baseband signal is received from anti-jam processing module 206, there may be minimal or no processing of the sampled baseband signal by the anti-jam processing module 206.

Signal Analysis Module

Figure 4A:
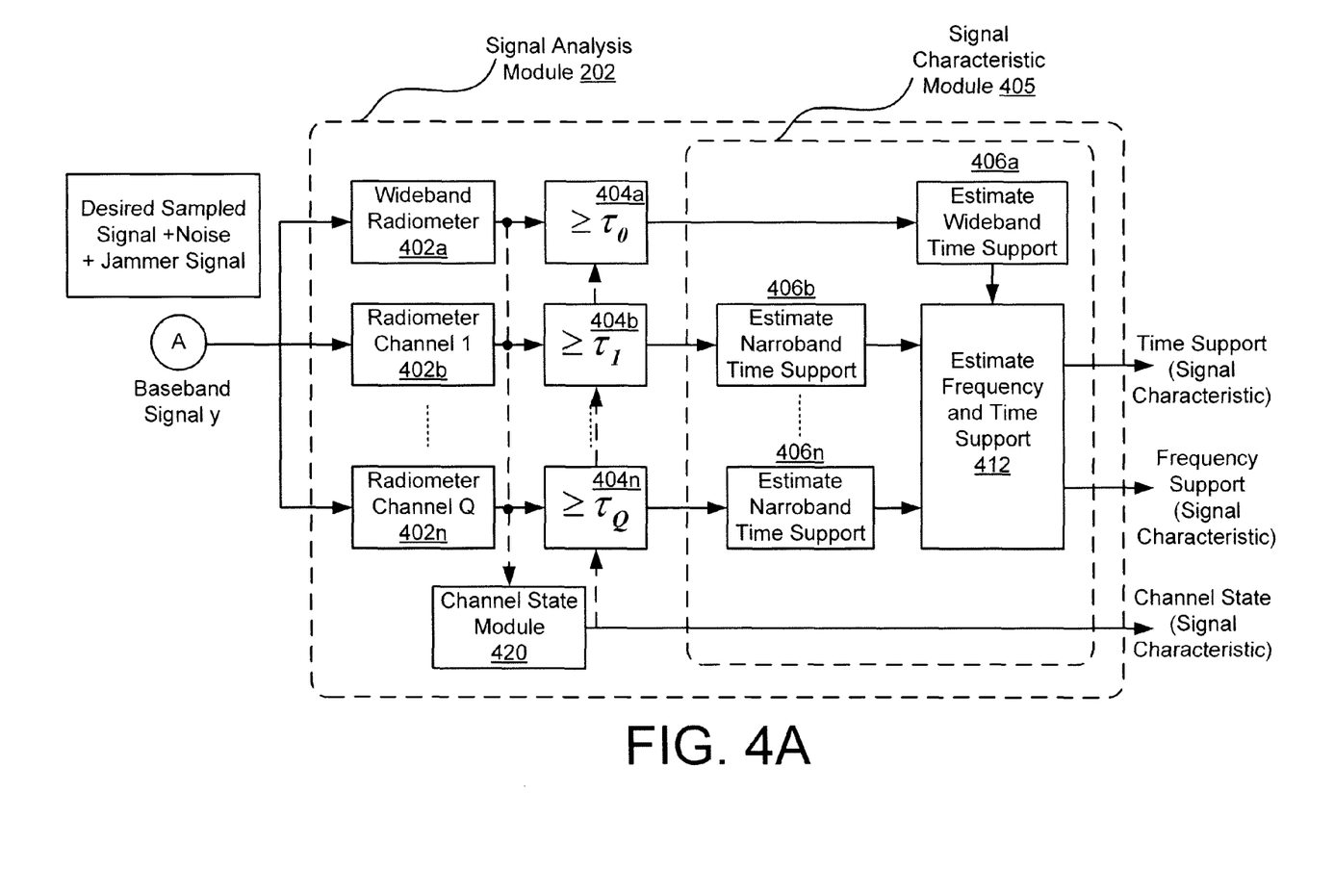
FIG. 4A illustrates an example block diagram of an example signal analysis module, according to an example embodiment of the invention.

FIG. 4A illustrates an example block diagram of an example signal analysis module 202, according to an example embodiment of the invention. As shown in FIG. 2, the signal analysis module 202 may include a plurality of radiometers 402*a-n* and a corresponding plurality of comparators 404*a-n*. In an example embodiment of the invention, at least one radiometer 402*a* may be a wideband radiometer configured to cover a plurality of the channels or frequency sub-bands included with the sampled baseband signal. As an example, the wideband radiometer 402*a* may cover 50%-100% of the channels or frequency sub-bands included with the sampled baseband signal. In addition, there may be other radiometers 402b-n that are configured to cover respective portions, frequency sub-bands, or channels of the sampled baseband signal. It will be appreciated that the radiometers 402b-n typically cover distinct portions, frequency sub-bands, or channels of the sampled baseband signal. However, the radiometers 402b-n may have overlapping portions, frequency sub-bands, or channels, at least in part, without departing from example embodiments of the invention. It will be appreciated that a narrowband jammer signal generally occupies a narrow band that is no greater than the bandwidth of the frequency sub-band or channel covered by a single radiometer 402b-n. On the other hand, a wideband jammer signal generally occupies a bandwidth that is greater than any single frequency sub-band or channel covered by any single radiometer 402b-n.

It will be appreciated that each radiometer 402a-n may be operative to detect or accumulate energy levels in wideband or for each portion, frequency sub-band, or channel, for which the respective radiometer 402a-n has been configured to cover. In this way, each radiometer 402a-n may provide a detected energy level in wideband or for each portion, frequency sub-band, or channel.

Figure 4B:
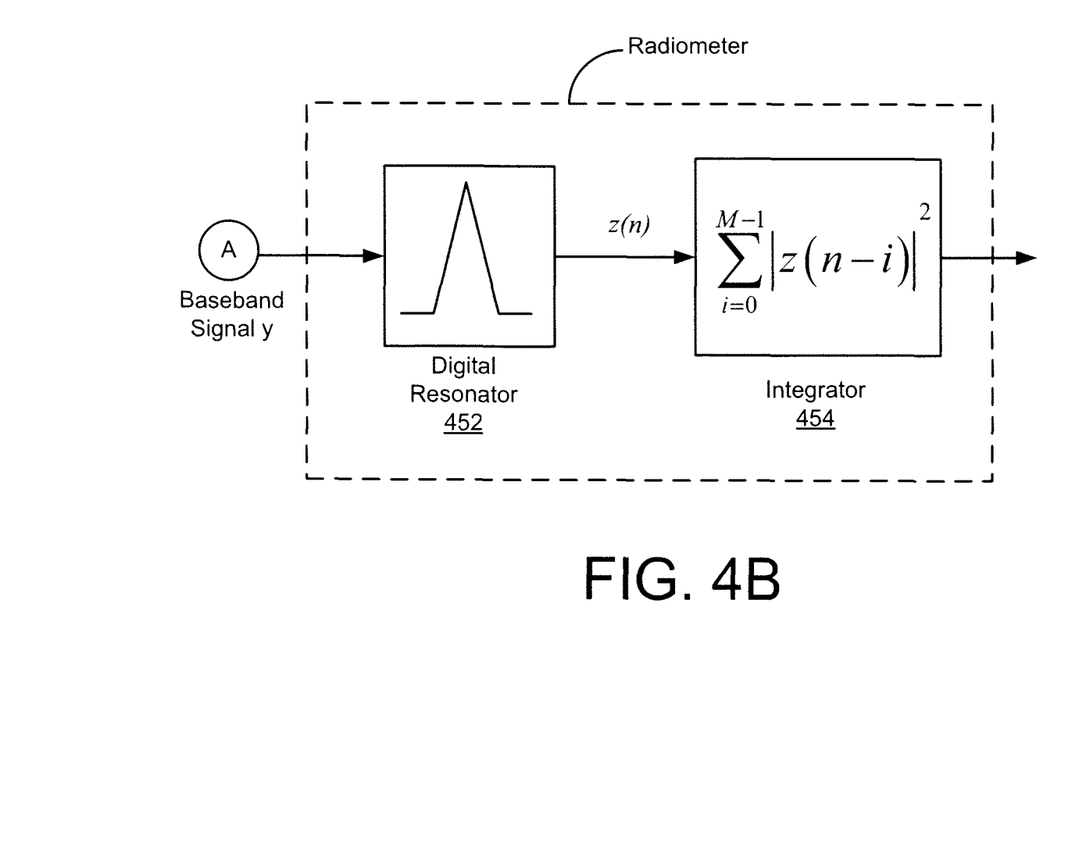
FIG. 4B illustrates an example one of a radiometer in accordance with an example embodiment of the invention.

It will be appreciated that one or more of the radiometers 402a-n may comprise one or more filters (e.g., bandpass filter) that are used to filter the sampled baseband signal to obtain the respective portion, frequency sub-band, or channel that is to be covered by the respective radiometer 402a-n. However, it will be appreciated that if a wideband radiometer 402a is to cover an entire frequency band, then the radiometer 402a may not necessarily utilize a filter, according to an example embodiment of the invention. In addition, each radiometer 402a-n may include an energy detector or measurement device. FIG. 4B illustrates an example one of a radiometer 402b-n in accordance with an example embodiment of the invention. As shown in FIG. 4B, an example radiometer may include a digital resonator 452 that is used to filter the sampled baseband signal to obtain the respective portion, frequency sub-band, or channel that is to be covered by the radiometer. The output of the digital resonator 452 may be provided to an integrator 454 that averages the energy measurement over a moving window of length M. A large value of length M may provide averaging over several noise samples and may reduce the variance of energy measurements, but the length M may also determine the minimum time resolution. Many variations of the example radiometers 402a-n illustrated in FIG. 4A are available without departing from example embodiments of the invention.

Referring back to FIG. 4A, the energy measurement of the radiometers 402a-n may be compared by respective comparators 404a-n to respective thresholds $\tau_0$-$\tau_Q$. It will be appreciated that the comparators 404a-n may be part of the radiometers 402a-n without departing from example embodiments of the invention. The results of the comparators 404a-n may be binary decisions $d_i(n)$ indicative of whether the respective threshold $\tau_0$-$\tau_Q$ comparisons have been satisfied. Generally, the thresholds $\tau_0$-$\tau_Q$ may be set in such a way to determine whether a particular portion, frequency sub-band, or channel detects energy associated "with" a jammer signal and/or a desired signal. Thus, where the desired signal is a spread-spectrum signal, energy levels above thresholds $\tau_0$-$\tau_Q$ may indicate a binary decision $d_i(n)$ representing the presence of a jammer signal. On the other hand, where the desired signal is a non-spread-spectrum signal, thresholds $\tau_0$-$\tau_Q$ may be set according to the ratio of jammer to signal power ratio (J/S), desired false alarm rate (FAR), and/or detection probability (Pd).

With respect to a spread-spectrum signal, it will be appreciated that the threshold $\tau_0$-$\tau_Q$ may be determined or adjusted as a function of or based upon the desired FAR as well as the signal-to-noise ratio (SNR), according to an example embodiment of the invention. The SNR may be determined or estimated by the channel state module 420, or alternatively, by the receiver signal processing module 208 and provided as part of the channel state information to the signal analysis module 202, either directly or via the cognitive decision unit 204. In an example embodiment of the invention, the example thresholds $\tau_0$-$\tau_Q$ may be determined as a function of the SNR and FAR, α by the following equation, which may be based upon a Gaussian approximation: $\tau = Q^{-1}(\alpha)\sigma_{sn} + \mu_{sn}$, according to an example embodiment of the invention. In the foregoing equation, $Q^{-1}()$ is the inversion Q-function (Gaussian tail probability), $\sigma_{sn}^2$ is given by an $\sigma_{sn}^2 = 4TB + 8SNR$, and $\mu_{sn}$ is given by $\mu_{sn} = 2TB + 2SNR$, where 2TB is the number of degrees-of-freedom of the signal whose energy is being measured or threshold by radiometer 402a-n and comparator 404a-n, according to an example embodiment of the invention. For example, let W represent a complete bandwidth of the system baseband signal. If a radiometer 402b-n bandpass filters the signal with a filter whose bandwidth B is some fraction of W, perhaps $$B = \frac{W}{KQ}$$

where K is the number of samples per chip and Q is the number of channelized radiometers 402b-n, and the number of discrete-time samples (sample rate by ADS 111 is W) used in the computation of the energy value is M, then the number of degrees-of-freedom 2TB may be computed as $$2TB = 2\frac{M}{W}\frac{W}{KQ} = 2\frac{M}{KW}.$$

It will be appreciated that many variations for computing thresholds $\tau_0$-$\tau_Q$ are available without departing from example embodiments of the invention.

As shown in FIG. 4A, a signal characteristic module 405 may receive, from each comparator 404a-n, respective outputs of binary decisions $d_i(n)$ indicative of whether the respective threshold $\tau_0$-$\tau_Q$ comparisons have been satisfied, and thus, whether a jammer signal is present in wideband or a respective portion, frequency sub-band, or channel. More specifically, the output of the comparator 404a may be provided to module 406a for determination or estimation of the wideband time support. Likewise, the outputs of respective comparators 404b-n may be provided to respective modules 406b-n for determination or estimation of the narrowband time support corresponding to a respective portion, frequency sub-band, or channel. Generally, modules 406a-n may determine the time support indicating the amount of time or number of samples during which the output of the comparators 404a-n indicate that the threshold $\tau_0$-$\tau_Q$ comparisons have been satisfied. As applied to a spread-spectrum system, module 406a may determine a wideband time support indicating how long a jammer signal has been detected in wideband or otherwise, a plurality of narrow bands, wherein each narrow band is no greater than the bandwidth of the frequency sub-band or channel covered by a single radiometer. Modules 406b-n may determine respective narrowband time supports indicating how long a jammer signal has been detected in each respective portion, frequency sub-band, or channel.

Module 412 may receive the time support information from modules 406a-n, and determine one or more signal characteristics, which may include one or more frequency support signal characteristics and/or one or more time support signal characteristics. The frequency support signal characteristic may indicate that a jammer signal is present in wideband based upon the wideband time support determined by module 406a, and perhaps confirmed by the narrowband time support determined by a predetermined number of modules 406b-n. On the other hand, if the jammer signal is not present in wideband, then the jammer signal may otherwise be present in one or more portions, frequency sub-bands, or channels. In this case, the frequency support signal characteristic may indicate which portions, frequency sub-bands, or channels have a detected jammer signal based upon the narrowband time support determined by one or more of modules 406b-n. In addition to providing frequency support signal characteristics, the signal characteristic module 405 may also provide one or more time support signal characteristics. The time support signal characteristic may indicate the amount of time or number of samples that the jammer signal has been detected, in either wideband or in a respective portion, frequency sub-band, or channel. Alternatively, the time support signal characteristic may indicate the maximum amount of time or number of samples that the jammer signal has been detected in any portion, frequency sub-band, or channel, according to an example embodiment of the invention. In addition, the signal analysis module may also provide the channel state signal characteristic from the channel state module 420. The channel state signal characteristic may provide information regarding the estimated signal-to-noise ratio (SNR), or other information such as the signal-to-jammer ratio or the estimated noise floor levels for wideband or one or more respective portions, frequency sub-bands, or channels, according to an example embodiment of the invention.

It will be appreciated that the example signal analysis module 202 of FIG. 4A has been illustrated for example purposes only, and that many variations are available. In addition, there may be other types of signal characteristics that may be generated by the example signal analysis module 202 beyond that illustrated in FIG. 4A. According to an example embodiment of the invention, it will be appreciated that the radiometers 402a-n may be replaced with other energy detector or measurement devices, or other means for energy detection or measurement. Example alternatives for energy detector or measurement devices that may be utilized for one or more of the radiometers 402a-n may include one or more of the following: filterbank analyzers, time-frequency transforms, discrete Fourier transforms, sliding transforms, etc.

Cognitive Decision Unit

Figure 5:
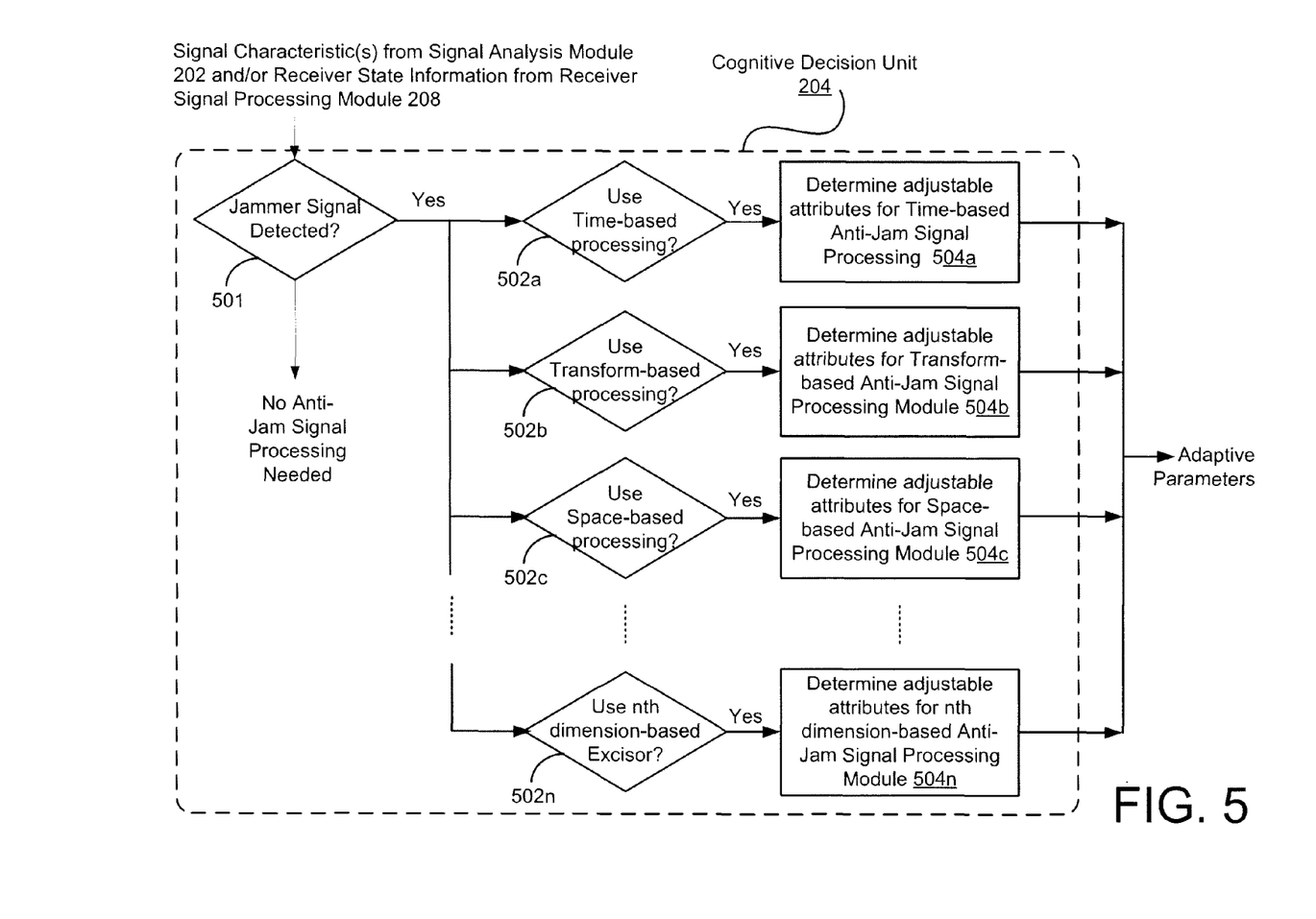
FIG. 5 illustrates an example cognitive decision unit, according to an example embodiment of the invention.

FIG. 5 illustrates an example cognitive decision unit 204, according to an example embodiment of the invention. As previously described with respect to FIG. 2, the example cognitive decision unit 204 may receive one or more signal characteristics from the signal analysis module 202, and optional receiver state information from the receiver signal processing module 208.

In block 501, the cognitive decision unit 204 may utilize the one or more signal characteristics provided by the signal analysis module 202, and alternatively or additionally, the receiver state information provided by the receiver signal processing module 208, to determine whether one or more jammer signals are detected in the sampled baseband signal. If no jammer signals, or a minimal amount of jammer signals are detected, then no anti-jam signal processing may be needed, and the sampled baseband signal may be processed by the receiver signal processing module 208, as similarly discussed by block 314 of FIG. 3.

On the other hand, the cognitive decision unit 204 may determine that one or more jammer signals are detected in block 501 based upon the one or more signal characteristics from the signal analysis module 202. For example, the signal characteristics may indicate the presence of one or more jammer signals in wideband or in one or more portions, frequency sub-bands, or channels, as well as the associated duration of the one or more jammer signals. In this case, the cognitive decision unit 204 may determine which one(s) of a plurality of anti-jam processing modules 206 are to be utilized to process the sampled baseband signal. As described herein, there may be a plurality of anti-jam processing modules 206 that each respectively operative to process the sampled baseband signal in one or more dimensions, including a time-based dimension, a transform-based dimension, a space-based dimension, and the like. Thus, block 502a may determine whether the qualifications for using time-based anti-jam signal processing are satisfied. Block 502b may determine whether the qualifications for using transform-based anti-jam signal processing are satisfied. Block 502c may determine whether the qualifications for using space-based anti-jam signal processing are satisfied. Block 502n may determine whether the qualifications for using an n-th dimension-based anti-jam signal processing are satisfied.

As an example, the decision between time-based or transform-based anti-jam signal processing may be based upon (i) whether the signal characteristics indicate that the at least one jammer signal covers more than a first threshold amount of frequency sub-bands (e.g., frequency support signal characteristic indicates wideband), or (ii) whether the signal characteristics indicate that the at least one jammer signal is present for less than a second threshold amount of time (e.g., time support signal characteristic indicates a short duration). In a more particular example embodiment of the invention, blocks 502a and 502b may be implemented as follows: if the jammer signal is both wideband and of a short duration, then the time-based anti-jam processing may be selected in block 502a while the transform-based anti-jam processing may not be selected in block 502b. According to an example embodiment of the invention, the jammer signal may be determined to have a short duration when: $N_{\hat{T}s} \leq N_{TRANSFORM,min}$, where $N_{\hat{T}s}$ is the number of discrete-time samples that correspond to the time support ($\hat{T}_s$) signal characteristic received from the signal analysis module 202, and $N_{TRANSFORM,min}$ is the minimum transform length (e.g., Fast Fourier Transform (FFT) length) for a transform-based anti-jam signal processing module 206.

On the other hand, if the jammer signal is not both wideband and of the short duration, then the transform-based anti-jam processing may be selected in block 502b while the time-based anti-jam processing may not be selected in block 502a. Similarly, block 502c may be implemented as follows: if the jammer signal is primarily received from a single direction or range of directions, then the space-based anti-jam processing may be selected in block 502c.

Based upon blocks 502a-n, one or more of block 504a-n may be enabled. Blocks 504a-n may generally determine values for adjustable attributes for each selected anti-jam processing module 206 that is to be utilized to process the sampled baseband signal. As an example, for time-based anti-jam processing, block 504a may determine an adjustable attribute indicating which discrete-time samples should be excised, perhaps based upon the time support signal characteristic. Likewise, block 504 may also determine another adjustable attribute indicating which predetermined value(s) should be substituted for the excised samples, which may be a zero value or a noise floor level received from the signal analysis module 202 or the receiver signal processing module 208. As another example, for transform-based anti-jam processing, block 504b may determine adjustable attributes indicating one or more of sample overlap size, window type, a window size, transform type, transform size, threshold value, or inverse transform type, which may be based on the received signal characteristics. For example, the time support signal characteristic may be used to select a transform type or size, which may likewise impact the overlap size, window type or size, or inverse transform type utilized, according to an example embodiment of the invention.

Accordingly, the cognitive decision unit 204 may generate one or more first adaptive parameters for one or more anti-jam processing modules 206, where the one or more first adaptive parameters may indicate one or more of (i) which one(s) of the one or more cognitive anti-jam processing modules 206 have been selected to process the sampled based signal, and/or (ii) values for adjustable attributes for the selected anti-jam processing modules 206.

Transform-Based Anti-Jam Processing Module

Figure 6:
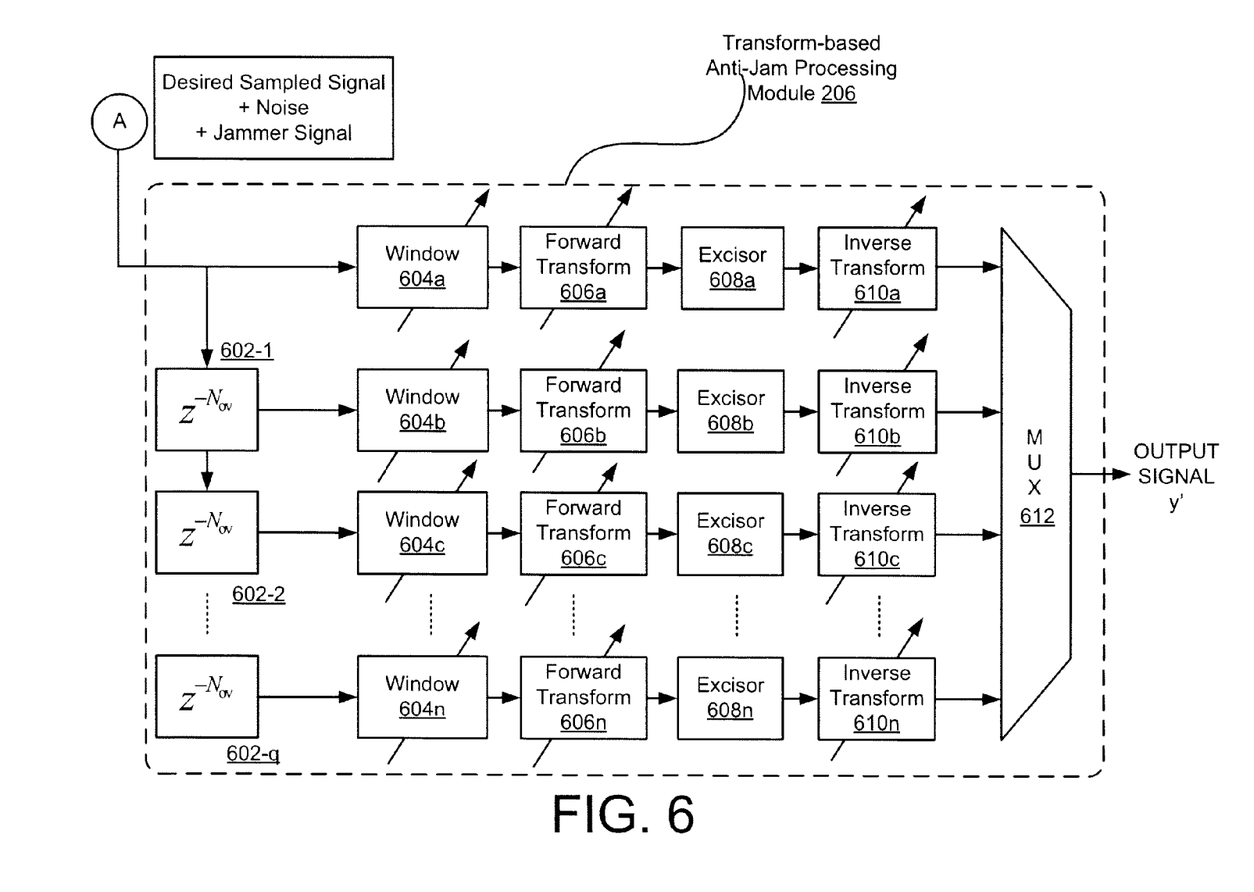
FIG. 6 illustrates an example of a transform-based anti-jam processing module in accordance with an example embodiment of the invention.

FIG. 6 illustrates an example of a transform-based anti-jam processing module 206 in accordance with an example embodiment of the invention. The transform-based anti-jam processing module 206 may be selected based upon the first adaptive parameters from the cognitive decision unit. It will be appreciated that the transform-based anti-jam processing module 206 is only one example of a plurality of anti-jam processing modules (e.g., time-based, space-based, etc.) that are available in accordance with example embodiments of the invention. The operation of the transform-based anti-jam processing module 206 in FIG. 6 will be discussed in conjunction with the flow diagram of FIG. 7.

Figure 7:
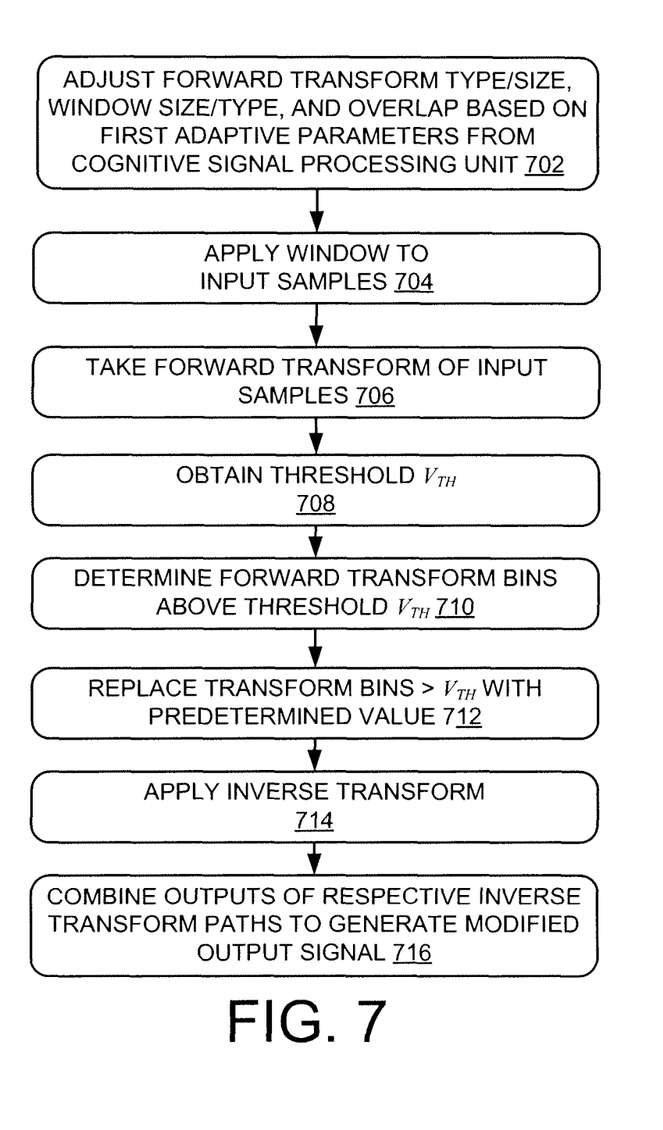
FIG. 7 illustrates a flow diagram of an example operation of an example transform-based anti-jam processing module, according to an example embodiment of the invention.

As shown in FIG. 6, the transform-based anti-jam processing module 206 may include a plurality of parallel branches a-n. At block 702, the first adaptive parameters from the cognitive decision unit 204 may be used to set one or more of the following attributes of the anti-jam processing module 206: (i) the overlap ratio or size used by delay blocks 602-1 to 602-q, (ii) the window size or type used by window blocks 604a-n, and/or (iii) the transform type or size used by forward transform blocks 606a-n. In addition, the first adaptive parameters may be also used to set one or more of the following additional attributes: (iv) the threshold value to use by the excisor blocks 608a-n to determine when to perform excision on a transform bin, (v) the predetermined value (e.g., zero or noise-floor level) to be used when performing excision by excisors 608a-n, and/or (vi) the inverse transform type used by inverse transform blocks 610a-n. It will be appreciated that the number of parallel branches in FIG. 6 may depend on the overlap ratio. For example, for an overlap ratio, OV=50%, there may be two parallel branches and the number of overlapped samples, $N_{OV}$, may equal the transform length ($N_{TRANSFORM}$) multiplied by the overlap ratio (OV). In FIG. 6, the appropriate blocks of overlapped samples may be provided using one or more of delay shift blocks 602-1 to 602-q as necessary.

At block 704, the block of samples in each parallel branch are windowed by respective window blocks 604a-n. It will be appreciated that window blocks 604a-n may be a selected one of a plurality of window functions such as Hamming or Gaussian window functions, as specified by the corresponding window type attribute specified in the first adaptive parameters from the cognitive decision unit 204. Likewise, a window size attribute specified by the first adaptive parameters may specify the window size for the selected window type.

At block 706, the windowed output samples from the window blocks 604a-n may be processed as input samples by respective forward transform blocks 606a-n. The forward transform blocks 606a-n may be a selected one of a Fast Fourier Transform (FFT) function, a fractional FFT (FrFFT) function, Discrete Cosine Transform (DCT) function, a wavelet transform, or another type of transform function as specified by the corresponding transform type attribute specified in the first adaptive parameters from the cognitive decision unit 204. Likewise, a transform size attribute in the first adaptive parameters may specify a transform size (e.g., between a minimum transform length ($N_{TRANSFORM,min}$) and maximum transform length ($N_{TRANSFORM,max}$) for the selected transform type. In an illustrative example, $N_{TRANSFORM,min}$ may be 128 samples while $N_{TRANSFORM,max}$ may be 1024 samples, although other sizes may be utilized without departing from example embodiments of the invention. The output of each forward transform block 606a-n may provide the power level in each respective forward transform bin, which may be received by respective excisor blocks 608a-n.

At block 708, the threshold value $V_{TH}$ for each excisor block 608a-n may be obtained. In an example embodiment of the invention, for a spread-spectrum signal, the threshold value may be based upon an average noise floor or signal power level, which may be received as an excisor threshold attribute in the first adaptive parameters from the cognitive decision unit. However, the threshold value such as the average noise floor could also be received from the signal analysis module 202 or the receiver signal processing module 208 (as receiver state information) without departing from example embodiments of the invention.

At block 710, the respective excisor blocks 608a-n may then compare the received power levels in each respective forward transform bin to respective threshold values. Based upon the comparison to the threshold value (e.g., threshold exceeded or not), the excisor blocks 606a-n may determine whether to excise a particular forward transform bin. In an example embodiment of the invention, power levels that exceed the threshold value will result in an excisor block 606a-n excising the corresponding forward transform bin, as illustrated by block 712. It will be appreciated that the excised bins may be set to a predetermined value, which may be provided by an excisor predetermined value attribute in the first adaptive parameters. As an example, the predetermined value may be a zero or a noise floor level, according to an example embodiment of the invention.

At block 714, the outputs of the respective excisors 608a-n, one or more of which may have performed the appropriate excision, may be provided to the respective inverse transform blocks 610a-n. Generally, the inverse transform blocks 610a-n may perform an inverse transform opposite the forward transform blocks in 606a-n, and may be selected based upon the inverse transform attribute received in the first adaptive parameters. At block 716, the output of the inverse transform blocks 610a-n may be combined by multiplexer 612 or another combiner to generate a modified output signal as an output of the transform-based anti-jam processing module 206.

Receiver Signal Processing Module

As described herein, the receiver signal processing module 208 may process the modified signal from the one or more anti-jam processing modules 206 to extract information about the desired signal from the modified signal. At block 310, the processing by the receiver signal processing module 208 may be optionally based at least in part on the received one or more second adaptive parameters from the cognitive decision unit 204, according to an example embodiment of the invention. Indeed, the one or more second adaptive parameters may affect how the receiver signal processing module 208 processes a modified signal received from the one or more anti-jam processing modules 206. Likewise, in some example embodiments of the invention, the modified signal may include distortion introduced from processing the baseband signal by one or more anti-jam processing modules 206. Thus, the receiver signal processing module 208 may adjust its processing based upon the one or more second parameters to compensate for the distortion introduced from processing the baseband signal by the one or more anti-jam processing modules 206.

Figure 8:
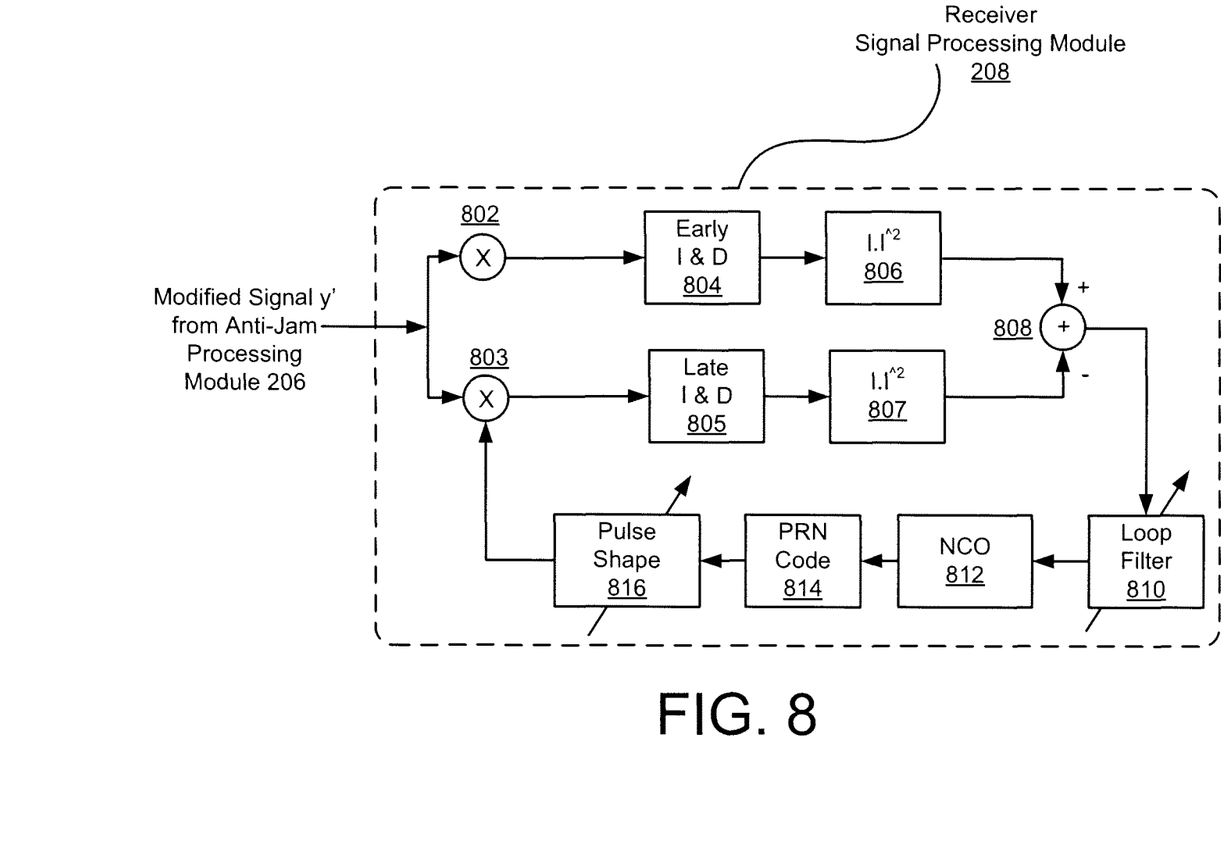
FIG. 8 illustrates an example receiver signal processing module that includes an example delay locked loop that may be utilized for a spread-spectrum receiver in an example embodiment of the invention.

FIG. 8 illustrates an example receiver signal processing module 208 that includes an example delay locked loop that may be utilized for a spread-spectrum receiver in an example embodiment of the invention. It will be appreciated that the receiver signal processing module 208 may include additional or alternative components beyond that shown in FIG. 8 without departing from example embodiments of the invention. As shown in FIG. 8, there may be multipliers 802, 803, early and late integrate and dump (I&D) modules 804, 805, and absolute square modules 806, 807, and a summation block 808. In addition, there may be a loop filter 810, a numerically controlled oscillator 812, pseudorandom noise (PRN) code 814, and a pulse shape 816. Receivers may also contain signal processing components associated with signal acquisition in time and frequency, which may include parameters such as integration or dwell period and may be comprised of coherent and non-coherent integration periods. An alternative receiver embodiment may also include a carrier tracking loop to track carrier frequency or phase using techniques known in the art such as a frequency-locked loop, phase-locked loop, Costas loop, or a decision-directed carrier loop. Other receivers may include data demodulation circuitry which may include forward error code (FEC) decoding such as convolutional decoding or Low Density Parity Check (LDPC) decoding. It is understood that the receiver may contain other components including an equalizer with adjustable coefficients or a programmable tracking loop smoothing filter. It will be appreciated that that receivers may selectively include one or more of these processing elements, where the receiver signal processing module 208 shown in FIG. 8 is intended to be only an illustrative example.

The receiver signal processing module 208 of FIG. 8 may process the modified signal from the one or more anti-jam processing modules 206 to extract information about the desired signal from the modified signal. In an example embodiment of the invention, the processing by the receiver signal processing module 208 may be adjusted based at least in part on the received one or more second adaptive parameters from the cognitive decision unit 204, according to an example embodiment of the invention. Indeed, the one or more second adaptive parameters may affect how the receiver signal processing module 208 processes a modified signal received from the one or more anti-jam processing modules 206. As an example, the one or more second adaptive parameters may adjust parameter or attributes of the loop filter 810 to adjust the effects of noise. Likewise, the one or more second adaptive parameters may adjust the pulse shape 816. It will be appreciated that one or second parameters may be used to adjust parameters of other components in the receiver signal processing module 208. As an example, other second parameters may adjust one or more of the following: Integration or dwell period, discriminator type (dot product vs. early-late for code/symbol tracking loops, or Costas vs. decision directed for carrier tracking loops), equalizer tap coefficients, etc.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system, comprising:
   a signal analysis module that processes a baseband signal to determine one or more signal characteristics of the baseband signal, the baseband signal comprising at least a desired signal;
   a cognitive decision unit that determines, based on the one or more signal characteristics received from the signal analysis module, whether at least one jammer signal is detected in the baseband signal, and if so, generates at least one first adaptive parameter; and
   at least one anti-jam processing module that processes the baseband signal to generate a modified signal that reduces an impact of the at least one jammer signal on a quality of reception of the desired signal from the baseband signal, wherein processing by the at least one anti jam processing module is based at least in part on the received at least one first adaptive parameter from the cognitive decision unit.

2. The system of claim 1, wherein the baseband signal includes one or more jammer signals, wherein the at least one anti jam processing module generates the modified signal by excising at least a portion of the one or more jammer signals from the baseband signal.

3. The system of claim 2, wherein the at least one anti jam processing module excises at least a portion of the at least one jammer signal from the baseband signal by replacing the excised portion with a predetermined value.

4. The system of claim 3, wherein the predetermined value is zero or a noise floor level.

5. The system of claim 1, wherein the cognitive decision unit further generates at least one second adaptive parameter, and further comprising:
   a receiver signal processing module that processes the modified signal from the at least one anti jam processing module to extract information about the desired signal from the modified signal, wherein processing by the receiver signal processing module is based at least in part on the received at least one second adaptive parameter from the cognitive decision unit.

6. The system of claim 5, wherein the at least one anti jam processing module and the receiver signal processing module are integrated or provided in a same module.

7. The system of claim 5, wherein the modified signal includes distortion introduced from processing the baseband signal by the at least one anti jam processing module, wherein the at least one second parameter adjusts the processing of the receiver signal processing module to compensate for the distortion introduced from processing the baseband signal by the at least one anti jam processing module.

8. The system of claim 7, wherein the at least one second parameter is utilized by the receiver signal processing module to configure a pulse shape or filter utilized in processing the modified signal by the receiver signal processing module.

9. The system of claim 1, wherein the at least one first adaptive parameter designates one or more of a plurality of dimensions to utilize by the at least one anti-jam processing module when processing the baseband signal to reduce an impact of the at least one jammer signal on the quality of reception of the desired signal.

10. The system of claim 9, wherein the plurality of dimensions includes at least a time dimension and a transform dimension, wherein the cognitive decision unit designates at least one of the time dimension or the transform dimension for utilization in the at least one first adaptive parameter.

11. The system of claim 10, wherein the cognitive decision unit designates at least one of the time dimension or the transform dimension in the at least one first adaptive parameter based upon the one or more signal characteristics providing frequency support information for the at least one jammer signal, the frequency support information indicating at least one of (i) one or more frequencies where the at least one jammer signal has been detected, or (ii) whether the at least one jammer signal is a wideband signal covering a plurality of radiometer frequency sub-bands or channels.

12. The system of claim 10, wherein the at least one first adaptive parameter is utilized by the anti jam processing module to configure processing in the transform dimension, wherein the at least one first adaptive parameter is utilized to configure one or more of: (i) a sample overlap size, (ii) a window size, or (iii) a transform type.

13. The system of claim 1, wherein the signal analysis module determines signal characteristics of one or more jammer signals present in the baseband signal based upon one or more frequency sub-bands of the baseband signal having a respective detected energy level exceeding a respective threshold value configured based upon at least one of a signal power level or a noise floor.

14. The system of claim 13, wherein a receiver signal processing module processes the modified signal from the at least one anti jam processing module to extract information about the desired signal from the modified signal, wherein the receiver signal processing module provides information on at least one of the signal power level or the noise floor to the signal analysis module.

15. The system of claim 13, wherein a plurality of radiometers is utilized by the signal analysis module to detect respective energy levels of a plurality of frequency sub-bands of the baseband signal.

16. A method, comprising:
processing, by a signal analysis module, a baseband signal to determine one or more signal characteristics of the baseband signal, the baseband signal comprising at least a desired signal;
determining, by a cognitive decision unit based upon one or more signal characteristics received from the signal analysis module, whether at least one jamming signal is detected in the baseband signal, and if so, generating at least one first adaptive parameter; and
processing, by at least one anti jam processing module, the baseband signal to generate a modified signal that reduces an impact of the at least one jammer signal on a quality of reception of the desired signal from the baseband signal, wherein processing by the at least one anti jam processing module is based at least in part on the received at least one first adaptive parameter from the cognitive decision unit.

17. The method of claim 16, wherein the baseband signal includes one or more jammer signals, wherein the at least one anti jam processing module generates the modified signal by excising at least a portion of the one or more jammer signals from the baseband signal.

18. The method of claim 16, The system of claim 1, wherein the cognitive decision unit further generates at least one second adaptive parameter, and further comprising:
processing, by a receiver signal processing module, the modified signal from the at least one anti jam processing module to extract information about the desired signal from the modified signal, wherein processing by the receiver signal processing module is based at least in part on the received at least one second adaptive parameter from the cognitive decision unit.

19. The method of claim 16, wherein the at least one first adaptive parameter designates one or more of a plurality of dimensions to utilize by the at least one anti-jam processing module when processing the baseband signal to reduce an impact of the at least one jammer signal on the quality of reception of the desired signal.

20. The method of claim 19, wherein the plurality of dimensions includes at least a time dimension and a transform dimension, wherein the cognitive decision unit designates at least one of the time dimension or the transform dimension for utilization in the at least one first adaptive parameter.

21. The method of claim 16, wherein the at least one anti jam processing module is selected, by the cognitive decision unit based on the at least one first adaptive parameter, from a plurality of anti jam processing modules.

22. A system, comprising:
a signal analysis module that processes a baseband signal to determine one or more signal characteristics of the baseband signal, the baseband signal comprising at least a desired signal;
a cognitive decision unit that receives the one or more signal characteristics from the signal analysis module, and generates at least one first adaptive parameter; and
at least one anti-jam processing module that processes the baseband signal to generate a modified signal that reduces an impact of at least one jammer signal on a quality of reception of the desired signal from the baseband signal, wherein processing by the at least one anti jam processing module is based at least in part on the received at least one first adaptive parameter from the cognitive decision unit, wherein the baseband signal includes one or more jammer signals, and wherein the at least one anti jam processing module generates the modified signal by excising at least a portion of the one or more jammer signals from the baseband signal by replacing the excised portion with a predetermined value.

* * * * *